United States Patent [19]
Chamia

[11] 3,890,544
[45] June 17, 1975

[54] MEANS FOR LIMITING THE DYNAMIC OVERREACH IN, FOR EXAMPLE, AN IMPEDANCE RELAY

[75] Inventor: Michel Chamia, Vasteras, Sweden

[73] Assignee: Allmanna Svenska Elektriska Aktiebolaget, Vasteras, Sweden

[22] Filed: Apr. 15, 1974

[21] Appl. No.: 460,988

[30] Foreign Application Priority Data
May 21, 1973 Sweden.............................. 7307107

[52] U.S. Cl.............................. 317/27 R; 317/36 D
[51] Int. Cl.². ......................................... H02H 3/26
[58] Field of Search....... 317/36 D, 27 R; 324/83 Q, 324/86

[56] References Cited
UNITED STATES PATENTS
3,532,935 10/1970 Waldron........................... 317/36 D
3,599,044 8/1971 Takemura et al................. 317/36 D Primary Examiner—James D. Trammell

[57] ABSTRACT

For limiting the dynamic overreach in impedance relays, there is provided a first comparator for comparing the condition of two periodic alternating quantities which delivers a signal of a definite appearance when a primary condition is fulfilled, and a second comparator which delivers a signal when a secondary condition is fulfilled. The second condition is a limitation of the primary condition. The two comparators are connected to each other to transmit a tripping signal when the primary condition is fulfilled at two consecutive measuring opportunities and when the secondary condition is fulfilled at any measuring opportunity. The primary condition is $\theta_1 \leq (argA - argB) \leq \theta_2$ and the second condition is $\theta'_1 \leq (argA - argB) \leq \theta'_2$, the secondary condition lying within the primary condition.

4 Claims, 6 Drawing Figures

3,890,544

MEANS FOR LIMITING THE DYNAMIC OVERREACH IN, FOR EXAMPLE, AN IMPEDANCE RELAY

BACKGROUND OF THE INVENTION

1. Field of the Invention

The invention relates to an arrangement for limiting the dynamic overreach in, for example an impedance relay.

2. The Prior Art

It is well known that impedance measuring of an alternating-current network can be carried out by comparing the amplitude or the phase between two suitable input signals A and B.

These signals can be directly derived from the currents and voltages of the power supply network or composed of, for example, voltages and voltage drops caused by currents which are generated in so-called compensating circuits.

Depending on the composition of the quantities, the phase comparison, for example, can be made more or less independent of the transient phenomena which take place when a sudden change in the condition of the power supply network occurs. The effect of the direct component in the measuring signals A and B on the phase comparison often seems to have a tendency to overreach. Even if the signals A and B theoretically have the same contents of direct component and therefore should give correct impedance measuring during phase comparison, some practical problems normally occur because the compensating circuits themselves generate transients which may disrupt the balance and may give rise to transient overreach.

Since the usual pattern for successive measurements of the signals A and B during transient conditions in the vicinity of the operating limit, for example immediately outside the limit of function, is that one measuring opportunity, a half period of A or B, results in overreach, whereas the following measuring opportunity results in underreach; blocking, one possible way of avoiding overreach can be to require that two consecutive measuring opportunities give a postive criterion for obtaining a function. In this way the decay of the transients is awaited.

An obvious disadvantage in this system, so-called AND-conditions on the half-period criteria, is that the times of function will never be shorter than the time between two consecutive measuring opportunities, that is, a half period of the alternating quantity and that the operating time can be impermissibly long, all depending on, for example, the time constant of the direct current component in the signals A and B.

SUMMARY OF THE INVENTION

The present invention relates to a device for limiting the dynamic overreach in, for example, impedance relays and comprises a first comparator for comparing the condition of two periodic alternating quantities, and means to transmit a signal of a definite appearance when a primary condition is fulfilled. According to the invention a second comparator is arranged to transmit a signal of a definite appearance when a secondary condition is fulfilled, the secondary condition being a limitation of the primary condition. The two comparators are connected to each other in such a way that the device transmits a tripping signal when the primary condition is fulfilled at two consecutive measuring opportunities, as well as when the secondary condition is fulfilled at any measuring opportunity.

BRIEF DESCRIPTION OF THE DRAWINGS

The invention will be explained with reference to the accompanying drawings.

Referring to the drawings.

DESCRIPTION OF THE PREFERRED EMBODIMENTS

A preferred embodiment relates to an impedance relay with phase comparators but it also relates to a relay with amplitude comparators, since the basic idea is that the device should be able to perform a logical combination of the signals from the two comparators.

The principle of phase comparison between two periodic input quantities A and B is generally that the condition $\theta_1 \leq (\arg A - \arg B) \leq \theta_2$ is to be fulfilled in order that a positive output signal might be obtained, where "arg" stands for "argument", the phase of a sinusoidal quantity in radians.

In a so-called 180° comparator, $\theta_1 = 0$ and $\theta_2 = \pi$. Such a phase comparator thus results in a positive output signal as soon as the condition $0 \leq (\arg A - \arg B) \leq \pi$ is fulfilled, which means that the sequence between A and B is that A precedes B. In the borderline case, when $(\arg A - \arg B)$ approaches one of the limits 0 or $\pi$, and arg B > arg A, an unbalance in the direct current component in A and B during dynamic operation may, for example, lead to the opposite sequence at a certain measuring opportunity, that is, arg A > arg B. A relay having such properties will have a certain tendency to dynamic overreach.

With a device according to the present invention, the degree of overreach can be controlled without causing an extended time of functioning within the whole range of operation of the relay. This is accomplished by the fact that the above-mentioned phase comparator with the condition $\theta_1 \leq (\arg A - \arg B) \leq \theta_2$, henceforward called the primary condition, is complemented with a second phase comparator with the condition $\theta'_1 \leq (\arg A - \arg B) \leq \theta'_2$, called the secondary condition. Here $\theta'_1 > \theta_1$ and $\theta'_2 < \theta_2$, so the secondary condition will always lie within the primary condition.

Figure 1:
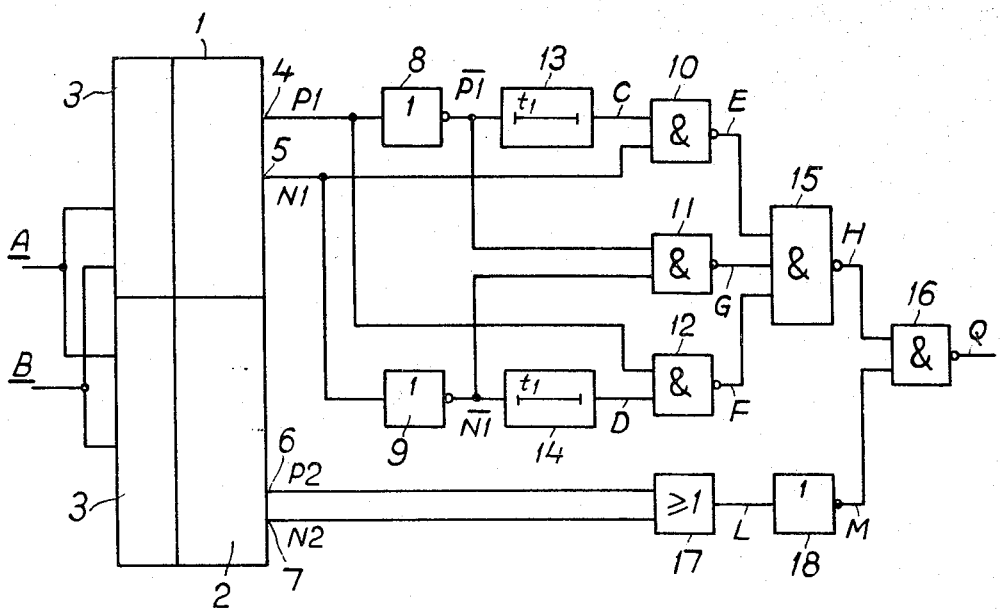
FIG. 1 shows a wiring diagram of the means.

In the embodiment of the device shown in FIG. 1, there is a first comparator 1 for the main condition and a second comparator 2 for the secondary condition. Both comparators have input circuits 3 for pulse shaping of the signals A and B, which are two vector quantities and represent voltage and current. Input circuits as well as comparators are of well-known design and are therefore not further explained here. The comparator 1 has two outputs 4 and 5 and the comparator 2 has also two outputs 6 and 7.

On the output 4 of the comparator 1 a positive signal P1 occurs as soon as the main condition is fulfilled during positive half cycles, and on the output 5 a positive output signal N1 occurs when the same condition is fulfilled during negative half cycles. The situation will be the same on the outputs 6 and 7 of the comparator 2, where output signals occur when the secondary condition is fulfilled.

The signal P1 is supplied to a first element 8 with a negated output and to a NAND element 12. In a similar way the signal N1 is supplied to a second element 9 with a negated output and to a NAND element 10.

The output signals $\overline{P1}$ and $\overline{N1}$, respectively, from the elements 8 and 9, respectively, are supplied to a NAND element 11 and to the NAND elements 10 and 12 by way of pick-up delay circuits 13 and 14, respectively. At the inputs of these NAND elements the signals are designated C and D, respectively. The signals occurring on the outputs of the three NAND elements 10, 11 and 12, respectively, are designated E, G and F, respectively, and are supplied to a fourth NAND element 15, on the output of which the signal H occurs and is supplied to an input on a fifth NAND element 16. On its output the signal Q occurs.

The output signals P2 and N2 are supplied to an OR element 17, the output signal L of which is supplied to a third element 18 with a inverted output where the signal M occurs and this signal is supplied to the second input on the NAND element 16.

Figure 2:
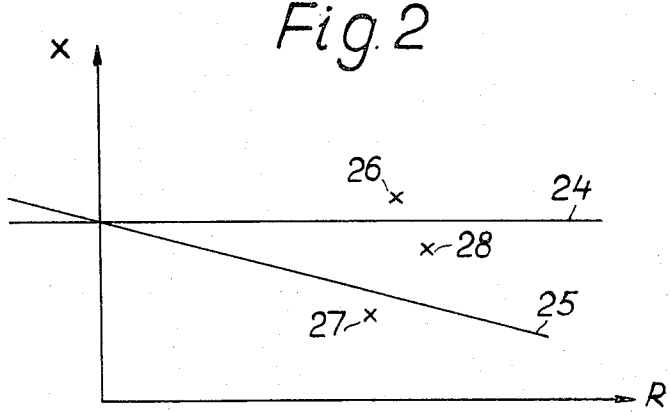
FIG. 2 shows an example of primary and secondary conditions in an impedance plane.
Figure 1A:
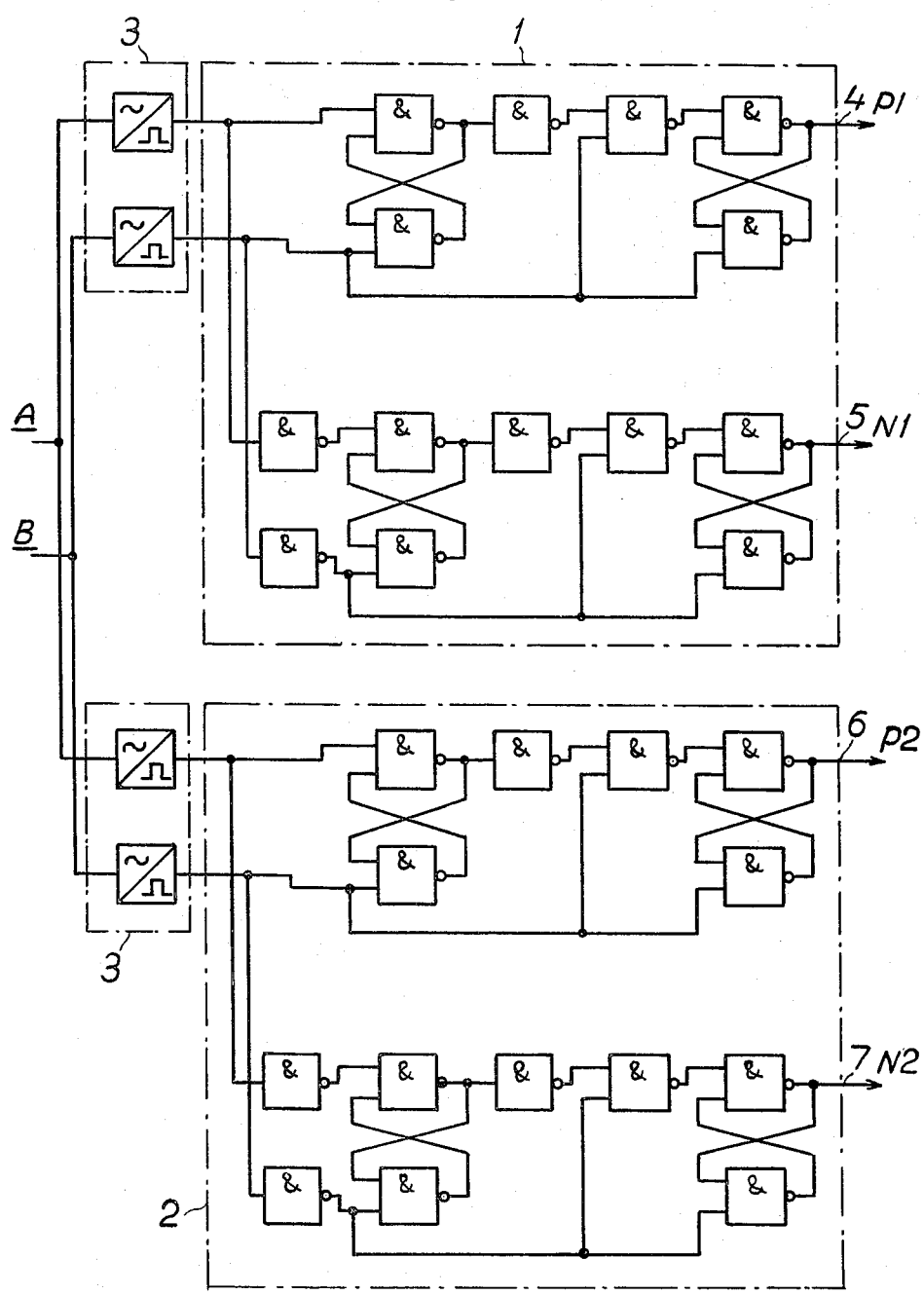
FIG. 1a shows the phase comparators.

FIG. 2 shows an impedance graph RX, in which the line 24 represents the primary condition $0 \leq (\arg A - \arg B) \leq \pi$ and the line 25 shows the secondary condition. For measuring values lying above the respective lines, the corresponding comparator is to emit a blocking signal, but when the measuring value lies below the line it is to emit a tripping signal.

The point 26 refers to the case shown in FIG. 3 and the meauring value is so close to the primary condition that this can be fulfilled if a transient interference occurs, in which case the measuring point will apparently fall below the line 24. The point 27 lies within the secondary condition and in such a case the device is supposed to emit a tripping signal immediately. The signal curves for this case are shown in FIG. 4. The point 28 lies between the two conditions. The secondary condition is not fulfilled whereas the primary condition can either be fulfilled at each measuring opportunity or only at every second measuring opportunity but tends to be fulfilled under stationary conditions. In both cases the device will emit a tripping signal when the primary condition is fulfilled at two consecutive measuring occasions. This case is shown in FIG. 5.

Figure 3:
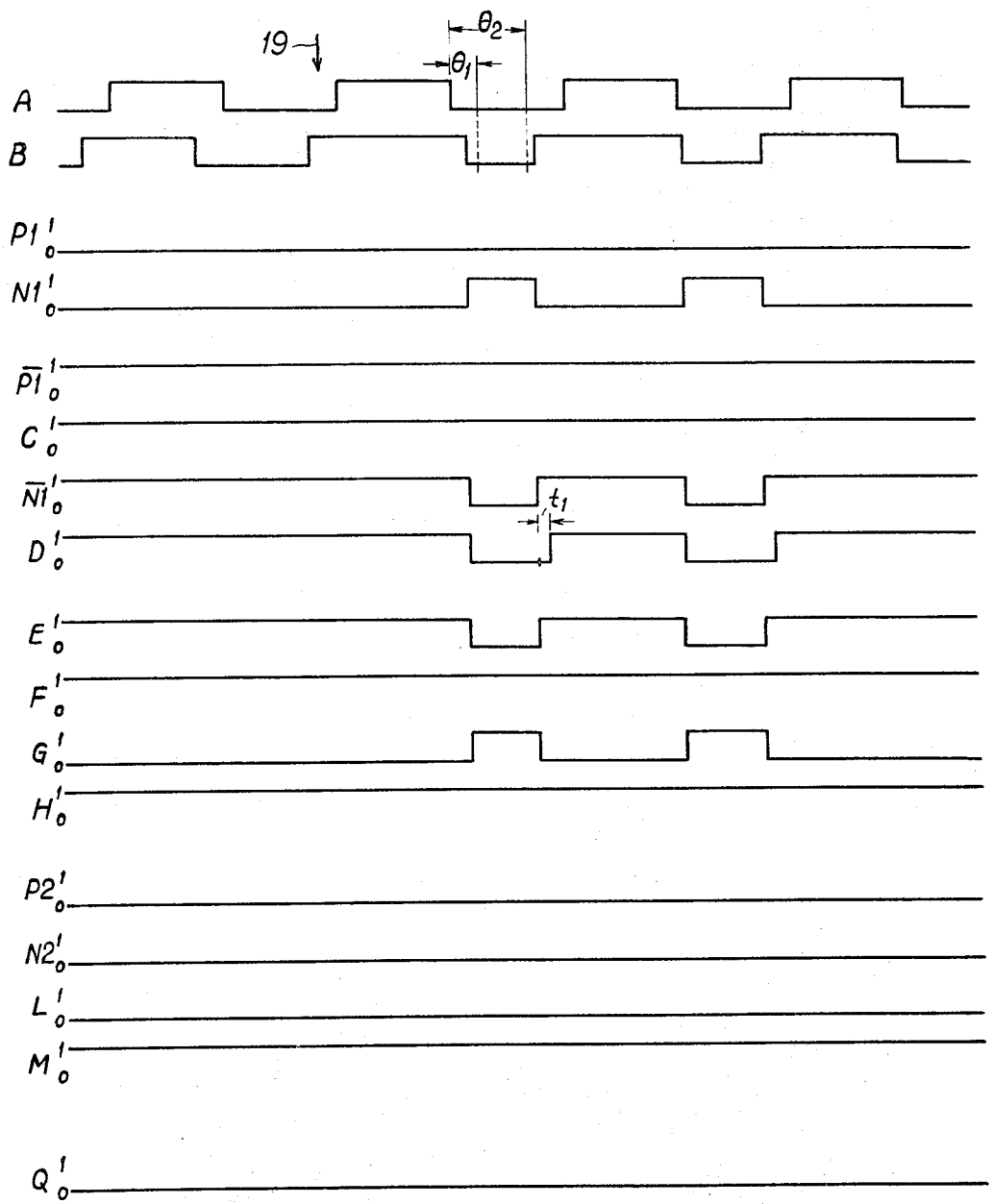
FIG. 3 shows the appearance of the signals in a number of points of FIG. 1 when the primary condition is fulfilled at every second measuring opportunity but when the secondary condition is not fulfilled.
Figure 4:
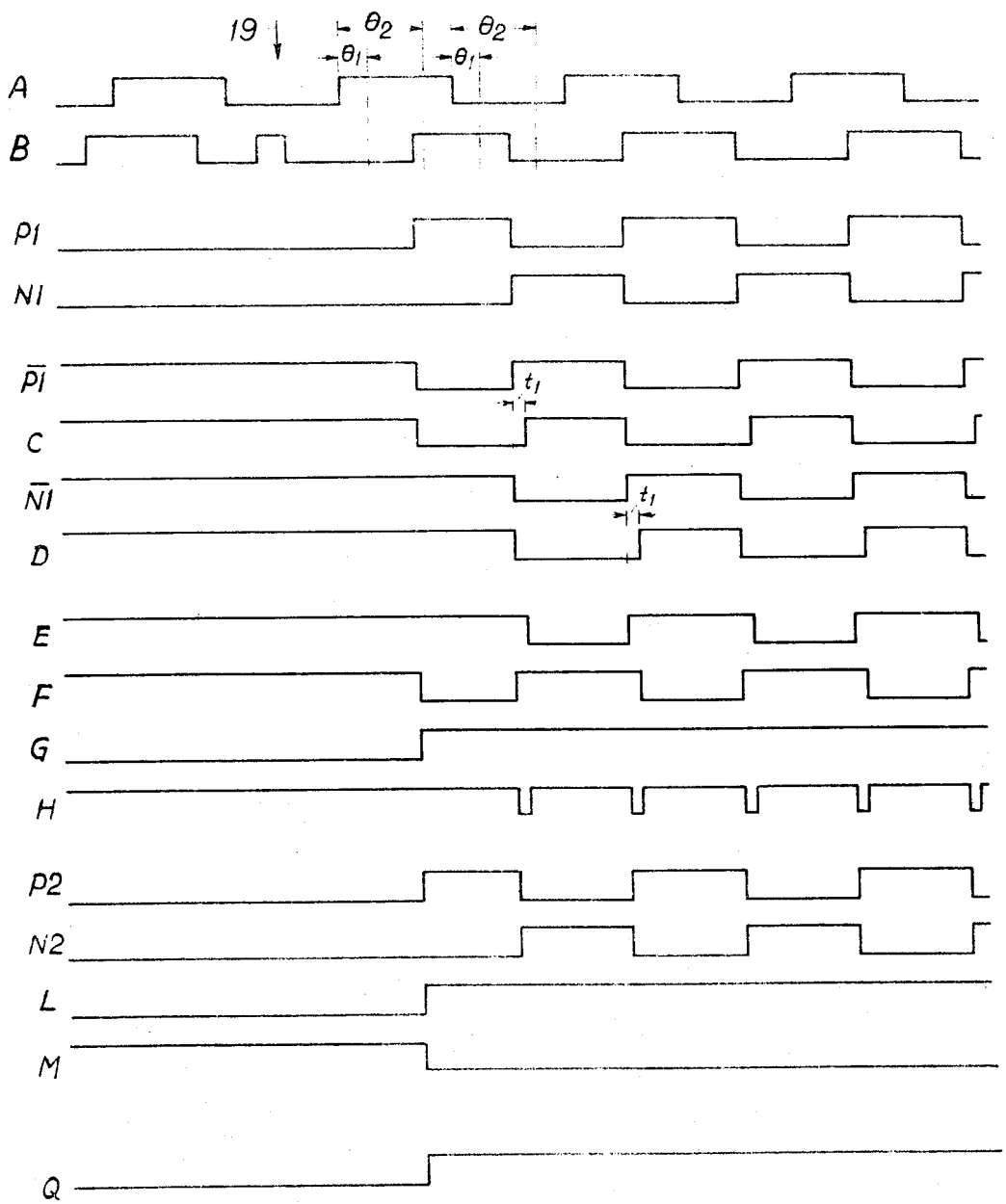
FIG. 4 shows the corresponding signal when both conditions are fulfilled.
Figure 5:
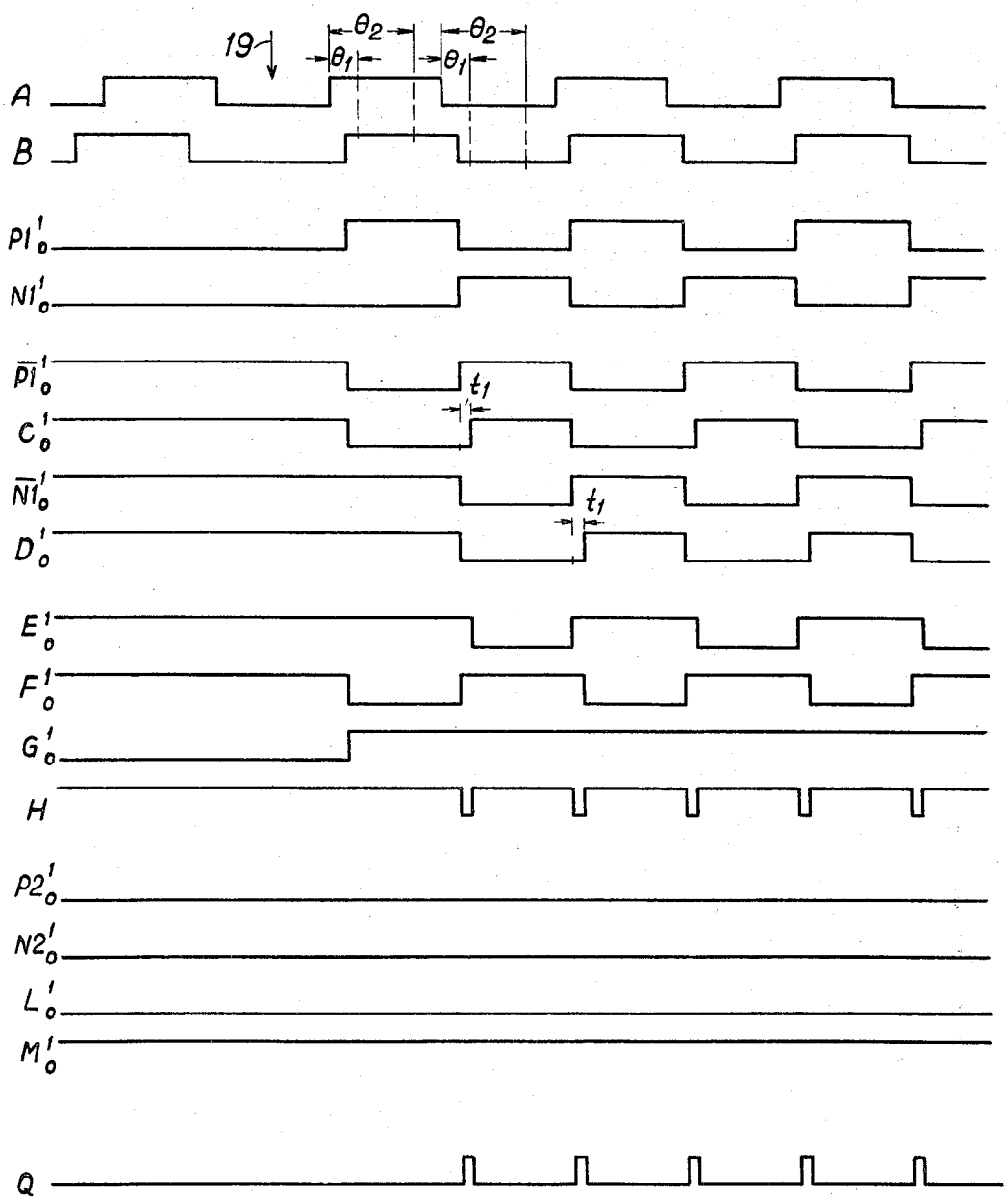
FIG. 5 shows the corresponding appearance of the signal when the primary condition is fulfilled at each measuring opportunity but the secondary condition is not fulfilled.

In the FIGS. 3, 4 and 5 the signals indicated in FIG. 1 and designated with letter symbols are graphed as functions of time. Also shown in the drawings are the angles $\theta_1$ and $\theta_2$, the pick-up delay time $t_1$ in the circuits 13 and 14 and an arrow 19 on top of the figures which designates the time of a change in condition of the signals A and B, to which the device is supposed to react.

FIG. 3 refers to the case when the line impedance measured by the device lies immediately outside the limit of function of a 180° phase comparator. This means that the primary condition is not fulfilled statically, but it can very well be dynamically fulfilled at the first measuring opportunity after a change in the condition of the input quantities. By choosing the limits $\theta_1$ and $\theta_2$ as the maximum transient angular deviation between A and B at a certain maximally allowed degree of overreach under the most unfavorable signal conditions, for example maximum asymmetry between A and B, the device can be caused to block during the first half cycle since the secondary condition is not fulfilled.

Since the normal pattern during dynamic operations with asymmetrical input signals is that measurings during successive half cycles will alternately overreach and underreach, the measuring at the next half cycle, when the primary condition is not fulfilled, will in this case result in a negative output signal causing a blocking function. In the event the third half cycle would still give rise to transient overreach, the transient angular deviation between A and B must now be smaller than at the first measuring opportunity, since the direct current component has decayed. Since the preceding half cycle did not result in operation, a change in the sequence from B before A to A before B is not detected again through the primary condition. The secondary condition is introduced again and the device continues to block. A positive output signal Q on the element 16 results in tripping whereas Q = 0 results in blocking.

FIG. 4 shows the appearance of the signals for relatively adjacently arising errors which clearly lie within the limit of operation for a 180° phase comparator. There the secondary condition is always fulfilled, even statically, and operation is obtained even at the first measuring opportunity after the change in sequence between A and B. The curve for the tripping signal Q shows that the operation is obtained without delay.

For ranges lying just inside the limit of operation for the primary condition, the secondary condition is not fulfilled. If the primary condition is fulfilled only every other half cycle, no operation is obtained, which is clear from FIG. 3, for this is interpreted by the device as a transient state of the input signals. However, a state of equilibrium soon arises and then the primary condition is fulfilled every half cycle and the device will work and release a tripping signal the second time the correct sequence is detected. This is shown in FIG. 5.

Since the comparators with the pulse shaping devices are wellknown constructions, the invention is in no way limited by their construction. Therefore the same operation can be obtained with one single comparator with the primary condition $0 \leq (\arg A - \arg B) \leq \pi$ and the secondary condition is obtained by controlling the coincidence and anti-coincidence times between A and B. Furthermore amplitude comparators can be used.

I claim:

1. Means for limiting the dynamic overreach in impedance relays and the like comprising a first comparator means (1) for comparing the condition of two periodic alternating quantities (A, B) and including means to deliver a signal of a definite appearance when a primary condition is fulfilled, a second comparator means (2) including means to deliver a signal when a secondary condition is fulfilled, the secondary condition being a limitation of the primary condition, and means connecting the two comparator means to each other to transmit a tripping signal when the primary condition is fulfilled at two consecutive measuring opportunities as well as when the secondary condition is fulfilled at any measuring opportunity.

2. Means according to claim 1, in which the comparator means are phase comparators and in which the primary condition is $\theta_1 \leq (\arg A - \arg B) \leq \theta_2$ and the secondary condition is $\theta'_1 \leq (\arg A - \arg B) \leq \theta'_2$, the secondary condition lying within the primary condition.

3. Means according to claim 2, in which $\theta_1 = 0$ and $\theta_2 = \pi$.

4. Means according to claim 1, in which the comparator means (1,2) comprise a single comparator for the primary condition and means for obtaining the secondary condition including means for controlling the coincidence and anti-coincidence times between the two quantities (A, B).

* * * * *